(12) United States Patent
Fagrell et al.

(10) Patent No.: US 6,933,482 B2
(45) Date of Patent: Aug. 23, 2005

(54) MICROWAVE HEATING APPARATUS

(75) Inventors: Magnus Fagrell, Uppsala (SE); Per Olov G. Risman, Härryda (SE)

(73) Assignee: Personal Chemistry I Uppsala AB, Uppsala (SE)

( * ) Notice: Subject to any disclaimer, the term of this patent is extended or adjusted under 35 U.S.C. 154(b) by 170 days.

(21) Appl. No.: 10/270,459

(22) Filed: Oct. 15, 2002

(65) Prior Publication Data

US 2003/0089707 A1 May 15, 2003

Related U.S. Application Data

(60) Provisional application No. 60/334,908, filed on Oct. 19, 2001.

(51) Int. Cl.[7] ................................................. H05B 6/70
(52) U.S. Cl. ........................ 219/695; 219/697; 219/746; 219/750; 422/21; 333/227
(58) Field of Search ................................ 219/695, 696, 219/697, 746, 748, 750; 422/21; 333/227, 228

(56) References Cited

U.S. PATENT DOCUMENTS

| | | | |
|---|---|---|---|
| 4,681,740 A | * 7/1987 | Commarmot et al. | ......... 422/78 |
| 5,393,492 A | * 2/1995 | Di Martino et al. | .......... 422/62 |
| 5,834,744 A | * 11/1998 | Risman | ....................... 219/697 |
| 5,869,817 A | * 2/1999 | Zietlow et al. | ............. 219/749 |

FOREIGN PATENT DOCUMENTS

| | | |
|---|---|---|
| DE | 4123921 A | 1/1993 |
| WO | WO 99 04897 A | 2/1999 |
| WO | WO 00 36880 A | 6/2000 |

OTHER PUBLICATIONS

Henryk Matusiewicz, "Development of a High Pressure/Temperature Focused Microwave Heated Teflon Bomb for Sample Preparation", Analytical Chemistry, American Chemical Society. Columbus, US. vol. 66, No. 5, Mar. 1, 1994 pp 751–755.
Search Report.

* cited by examiner

*Primary Examiner*—Philip H. Leung
(74) *Attorney, Agent, or Firm*—Harness, Dickey & Pierce, P.L.C.

(57) ABSTRACT

Microwave heating apparatus comprising an elongated dielectric microwave applicator with an axial TM type mode, said dielectric applicator is provided with a load chamber for a load to be heated, said load chamber is located in a centered axial position inside the applicator. Two microwave feeding points are arranged at a lower end of the applicator for feeding microwave energy in the axial direction of the applicator so that significant cross-talk between the applied microwaves is avoided.

19 Claims, 2 Drawing Sheets

MICROWAVE HEATING APPARATUS

This application claims the benefit of Provisional application Ser. No. 60/334,908, filed Oct. 19, 2001.

FIELD OF THE INVENTION

The present invention relates to a microwave heating apparatus and a method in microwave heating apparatus according to the preambles of the independent claims.

BACKGROUND OF THE INVENTION

In the chemical industry the process of obtaining new substances or compounds generally follows a basic development route starting in a small-scale volume where many different substances or compounds may be evaluated. Further on in the development route where a specific substance or compound should be tested, e.g. in the case of pharmaceutical substances where many test procedures have to be performed or when developing new materials for the semiconductor industry, much larger volumes are needed than those available in the initial small scale stages.

A particular requirement of systems for performing these tasks is that most processes takes place under a pressure which may be ten times normal atmospheric pressure.

Thus, there exists a general demand in the chemical industry to be able to obtain larger volumes of a substance or compound, under such processing conditions. This should however not be regarded as limiting the scope of the invention. The present invention is applicable for volumes from 10 mL and larger.

There is very often a need to very rapidly heat up the load volume, a typical design criterion being 5 K/sec. Supposing 50 mL of a typical liquid with a heat capacity of 2 J/mL, K is the power requirement and becomes 500 W. To feed this high power into a small cavity may be problematic, in particular with the need for a pressure sealed microwave feedthrough, and the need for a reasonably even heating of the load is a further difficulty.

Microwave assisted chemistry has been used for many years. However, the apparatuses and methods have to a great extent been based upon conventional domestic microwave ovens. Domestic microwave ovens have a multimode cavity and the energy is applied at a fixed frequency at 2450 MHz; the available microwave power is up to 1 kW but the fact that such ovens are not designed for loads of this kind result in a typical microwave efficiency way below 50%. The use of single mode cavities have also been reported, see e.g. U.S. Pat. No. 5,393,492 and U.S. Pat. No. 4,681,740.

Recent developments have led towards apparatuses comprising a microwave generator, a separate applicator for holding the load (or sample) to be treated, and a waveguide leading the generated microwave energy from the generator and coupling it into the applicator. Even if the system consists of a $TE_{10}$ waveguide using a 2450 MHz to which a magnetron generator is connected in one end and the sample container is in the other end, there is a need for a matching device in the form of at least a metal post or iris between the generator and load, in order to achieve a reasonable efficiency.

When coupling electromagnetic radiation such as microwaves from a source to an applicator, it is important to match the transmission line impedance to the applicator impedance (with load) in order to achieve a good transfer of power. It is of particular importance that a range of liquids over a range of temperatures can be used. However, the dielectric properties of the load then vary considerably and may influence drastically upon the impedance of the applicator, as well as its electrical size. Thus, an impedance mismatch between the source and the applicator will often occur and the coupling and thereby the heating process becomes less efficient and difficult to predict.

Below follows a short background description of different transmission modes used in a microwave applicator.

Consider a hollow waveguide with a given cross section that is uniform throughout its entire length. According to the known theory, a discrete number of two types of modes are then possible within a limited frequency range-the transverse electric (TE) mode and the transverse magnetic (TM) mode. TE modes have only E field components transverse (that is perpendicular) to the direction of propagation, whereas the H field has both transversal and longitudinal components. TM modes have only H field components transverse (that is perpendicular) to the direction of propagation, whereas the E field may have both transversal and longitudinal components.

One of the most important characteristics of TE and TM modes is that there is a cutoff wavelength for each mode of transmission. If the free-space wavelength is longer than the cutoff value, that particular mode cannot exist in a long waveguide. For any given waveguide, the mode that has the longest cutoff wavelength is known as the dominant mode. The particular mode is given in index form and, as an example, in a rectangular waveguide the $TE_{10}$ mode is dominant.

A transverse magnetic type mode with indexing using the nomenclature for circularly polarized cylindrical resonators is $TM_{mnp}$ where m is the circumferential direction, n is the radial direction, and p is the axial direction of propagation.

In U.S. Pat. No. 5,834,744 a tubular microwave applicator for applying microwaves to a load having a generally circular cross-section is described. The applicator supports a dominant $TM_{120}$ mode and the load is aligned with a central axis in the applicator. The applicator has an airfilled microwave cavity fed by a pair of slot apertures coupling microwave energy from a waveguide feed system connected to a source of microwave energy. The waveguide supplies a symmetrical rectangular $TE_{10}$ mode split into waveguide arms with slot apertures sized and positioned to only excite the $TM_1$ mode type in the applicator cavity.

The applicator disclosed in U.S. Pat. No. 5,834,744 is supplied with microwave energy from the waveguide feed system having cavity feeding ports in the applicator periphery, i.e. from a radial direction.

This known applicator has a limitation with regard to the ability to achieve an efficient pressure seal of the applicator due to the radial direction of the feed system. Thus, arranging a proper pressure seal may be rather expensive and technically difficult.

An applicator geometry suitable for treating a load under pressure is described in a Technical Note [Matusiewicz, Development of a High Pressure/Temperature Focused Microwave Heated Teflon Bomb for Sample Preparation, Analytical chemistry Vol. 66, No 5, 1994]. A cylindrical steel vessel is lined with a ceramic material on the inside, and the load is located in a frustum conical container inside. The microwaves are fed into the structure by a coaxial line from below, connected to an internal coupling antenna system in the ceramic. The top of the vessel is closed by a compression plate and a lug.

The antenna system has a quite complicated shape that makes it problematic and expensive both to manufacture and to control with regard to the need for tight contact with the ceramic material. Furthermore, the actual shape and design of the antenna system are given only in a schematic figure. From that figure it is, however, possible to conclude that the antenna system is either in a rotationally symmetric cup shape, or in wire or thin plate U shape, in both cases with a symmetric feed by the coaxial center conductor from below. It is indeed very unclear if the described system is capable of being used with the high microwave powers envisaged for the system of the present invention; as a matter of fact the description gives only one example, at 90 W. Not only is the manufacturing process of the antenna system problematic, but it can also be unambiguously shown by microwave modeling using the data in the schematic figure that either a rotationally symmetric cylindrical $TM_0$ mode or (in the case of the complicated U-shaped antenna) more complicated degenerated modes having no useful polarization or other property which allows refinement or optimization of the design for anything but impedance matching—the feed and antenna system is a single solution which must be used as is and cannot be complemented by for example a second orthogonal system.

The object of the present invention is to achieve a microwave heating apparatus adapted to heat load volumes of 10 mL or more, which can be used with microwave power levels exceeding 1 kW if desired, and that may also be pressure sealed in a cost efficient way.

SUMMARY OF THE INVENTION

The above-mentioned object is achieved by a microwave heating apparatus, and a method of heating a load using the microwave heating apparatus according to the independent claims.

Preferred embodiments are set forth in the dependent claims.

Thus, the microwave heating apparatus comprises an elongated dielectric microwave applicator fed as to create axial TM type modes. The outer parts of the applicator are of a microwave transparent material and there is an internal load chamber located in a centred axial position inside the applicator, for a load to be heated. By arranging two coaxial TEM line feeds at a lower end of the applicator, in the axial direction of the applicator, and dimensioning the feeding zone for particular axial quadrature TM modes, significant cross-talk between the two microwave feed lines is avoided if they operate at the same frequency. The spatial mode quadrature means that they are orthogonal in the sense that the mutual coupling between them becomes insignificant. This in turn provides an easily handled microwave heating apparatus that is in particular useful for high power applications using two independent microwave generators, since these sources will then not interfere with each other even if they operate at the same frequency. The apparatus is also very suitable when heating loads where pressure seals are needed.

SHORT DESCRIPTION OF THE APPENDED DRAWINGS

DETAILED DESCRIPTION OF PREFERRED EMBODIMENTS OF THE INVENTION

Figure 1:
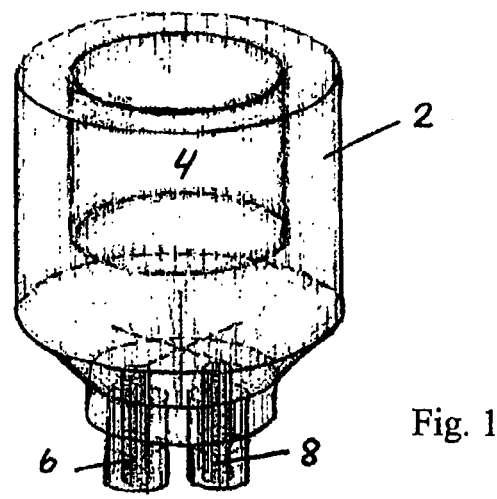
FIG. 1 shows a perspective view of the microwave heating apparatus according to the present invention.

With references to FIGS. 1 and 2, the microwave heating apparatus according to the invention will now be described. The microwave heating apparatus comprises an axially elongated cylindrical dielectric microwave applicator 2, preferably circularly cylindrical. The applicator is in principle completely filled with a dielectric, typically a ceramic having a permittivity higher than 4. This causes the electrical dimensions to become larger by the square root of this permittivity value, so that the actual applicator dimensions can be made correspondingly smaller; for a permittivity of 4 the applicator volume thus becomes (very approximately) $4^3$=64 times smaller than a corresponding air filled applicator. There is a hole forming a load chamber 4 located in a centred axial position inside the applicator where a load (not shown) to be heated is arranged. The applicator further comprises two microwave feeding points 6, 8 arranged at the lower end 10 of the applicator for feeding microwave energy in the axial direction of the applicator.

The applicator is divided along its longitudinal axis in two sections, an upper section 12 (FIG. 2) where the load chamber is arranged and a lower section 14 (FIG. 2) below the load chamber.

The lower section of the dielectric applicator is shaped so that a mode filter for a circular $TM_1$ mode is achieved. The lowest mode ($TM_0$) can also in principle be excited, but with a significantly lower efficiency; additionally, the whole applicator with load is dimensioned to be resonant with only modes emanating from $TM_1$ transmission modes in the lower section.

Preferably, the lower section of the applicator has a conical shape. Since its periphery is metallized and the ceramic body is intended to be mounted and fixed in a thick steel tube for creating a pressurised system (see FIG. 4), the steel tube has preferably a welded or turned indent 22 against which the ceramic body will stop if the pressure from above due to the load may cause the body to otherwise slide downwards in the tube. Hence, the indent forms a part of the efficient pressure sealing of the assembly.

Making the outside of the ceramic body frustum conical is possible, but a circularly cylindrical shape is preferred. It can also be made elliptical; this may have some particular advantages of improved impedance matching when the two feeds are along the major and minor axes, since the different resonances in the load chamber section above may then be excited (with a circular shape the modes will be identical and only 90° displaced).

The inner load chamber of the ceramic body can in principle have any shape. However, the highest space efficiency is with a cylindrical shape and a diameter determined so that proper wave propagation can occur in the outer ceramic region, and the requirements on pressure withstanding are maintained.

The load chamber has an access opening 16 in the axial direction on the end of the applicator opposite that of the feeding points.

The load chamber is essentially cylindrical and the upper section of said microwave applicator has a cylindrical outer shape.

The dominating mode in the applicator is $TM_{mnp}$, where m=1, 2 or 3; n and p>=1.

The load chamber has a volume of 10 mL or more.

Figure 3A:
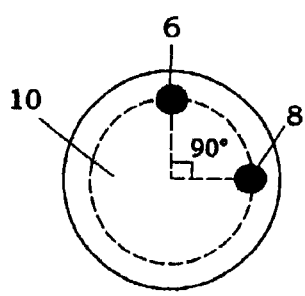
FIGS. 3a–3c show first, second and third embodiments, respectively, of the placement of feeding points in the lower end of the microwave applicator.

According to a first preferred embodiment of the present invention the mode is $TM_{1np}$, and the coaxial microwave feeding points are arranged at the same distance from the centre axis of the applicator and separated a×90 degrees, where a=1 or 3 and n and p>=1. This is illustrated in FIG. 3a that shows the lower end of the applicator from below. In the figure a dashed lined circle is included to illustrate that the feeding points are arranged at the same distance from the centre axis of the applicator and in the illustrated example they are separated 90 degrees (a=1).

Figure 3B:
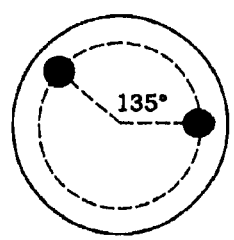

According to a second preferred embodiment of the present invention the mode is $TM_{2np}$, and the coaxial microwave feeding points are arranged at the same distance from the centre axis of the applicator and separated a×45 degrees, where a=1, 3, 5 or 7 and n and p>=1. This embodiment is illustrated in FIG. 3b showing one possible placement of the feeding points where the separation is 135°. The reason of choosing 135° (a=3) is purely practical in that the applicator is easier to manufacture and use if the linear distance between the feeding points not is to small.

Figure 3C:
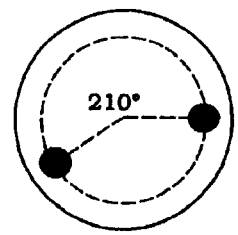

According to a third preferred embodiment of the present invention the mode is $TM_{3np}$, and the coaxial microwave feeding points are arranged at the same distance from the centre axis of the applicator and separated a×30 degrees, where a=1, 3, 5, 7, 9 or 11 and n and p>=1. This embodiment is illustrated in FIG. 3c showing one possible placement of the feeding points where the separation is 210°.

The microwave energy is generated by a microwave generator (not shown) that generates microwave energy of the same frequency that is applied to the two feeding points.

According to a preferred embodiment the dielectric applicator is made from alumina (aluminium oxide), which is commercially available in pure, dense form and has very low microwave losses. In cases where the applicator is to withstand heavy pressure and high temperatures, this or similar ceramic materials are preferred, such as steatite of feldspar ceramic. In use with microwave power of several kilowatts, low losses in the dielectric material, and the volume of the material that is needed, are the most important factors. A material with permittivity 40 and above may have no particular advantages since the material thickness needed for proper function according to the invention may then be too thin which is not acceptable for mechanical or pressure withstanding reasons. A permittivity lower than about 4 will not give sufficient volume-saving advantages.

Figure 4:
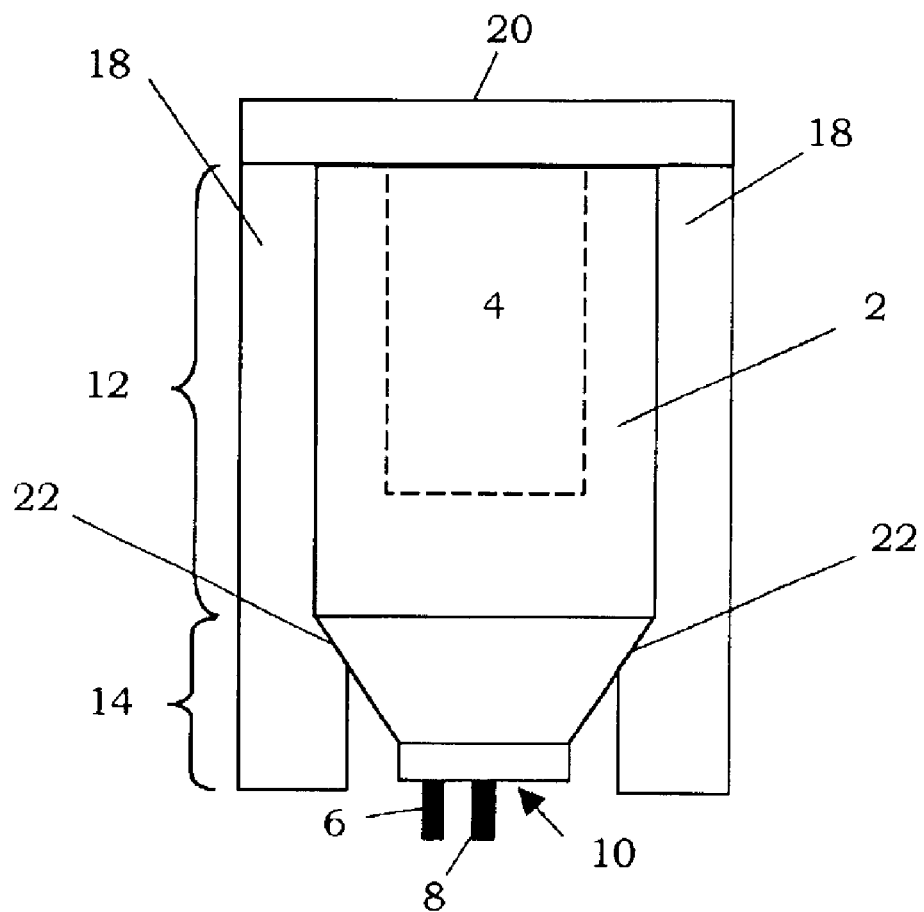
FIG. 4 shows a side view of the microwave heating apparatus according a further embodiment of the present invention.

In a further embodiment illustrated in FIG. 4, the apparatus further comprises a metal tubing means 18 wherein the microwave applicator is fitted inside said tubing means to take up pressure generated in the applicator when heating a load. Preferably this tubing means is a steel tube. The tubing means is provided with a closure member 20 adapted to seal the tubing means at the end facing an upper end of the applicator.

The microwave applicator may preferably be fitted in the tubing means by a special fitting process used to secure that it remains in place even at very high pressures.

Figure 2:
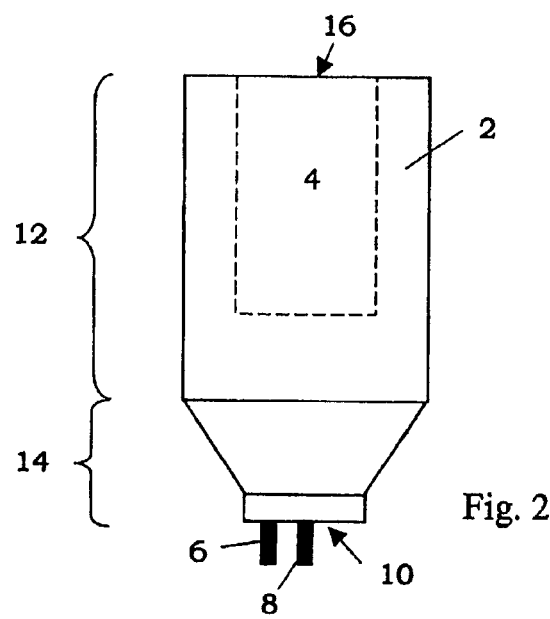
FIG. 2 shows a side view of the microwave heating apparatus according to the present invention.

Apart from the tubing means and the closure member the reference signs used in FIG. 4 are the same as in FIGS. 1–3.

The apparatus is especially well adapted to be used as a load chamber applicator for very high pressure.

The lower section of the applicator covers the whole inner cross section of the surrounding metal tube, so that only the applicator top will need a pressure-sealing door. In order to further increase the ability to withstand high pressure the lower part of the metal tubing means may be provided on its inner surface with inward protruding means, e.g. the above-mentioned indent 22, arranged to keep the applicator in place when exposed to high pressure.

It has been shown that it is possible to produce such large bodies and in addition obtain a very high quality mechanical, pressure and microwave seal to the tubing means, e.g. a steel tube, using a specific process. In one embodiment, the body is then 85 mm in diameter and provided with a cylindrical hole forming the load chamber with about 65 mm diameter and over 70 mm depth.

The dielectric applicator is preferably metallized on all rounded surfaces apart from the top of the applicator and the bottom end where the microwave feeding regions are arranged. The top of the applicator is electrically open and this results in a favourable field distribution in the top region of the load, and a reduced sensitivity of the system to load height variations. Since the permittivity of the ceramic is very high, the applicator mode becomes very much beyond cutoff wavelength above the top; i.e. the fields decay so rapidly that they have essentially vanished 3–5 mm above the ceramic surface in the case of using alumina as ceramic material. Therefore, a low permittivity material and/or a metallic lid or similar can be arranged quite close to the ceramic top, if desired, without influencing or being influenced by the microwaves.

Application of external pressure as well as gas-flow for cooling (and pre- or simultaneous heating of the applicator) can be made through small holes through the applicator ceramic, without any problems.

In one specific exemplary embodiment of the invention, the load has diameter of 40 mm and is contained in a 3 mm material thickness borosilicate glass container. The bottom of the container is slightly rounded, by being 5 mm lower at the axis than in the periphery.

The load height (above the rounded part) is also 40 mm, so that the overall load volume becomes about 53 mL. The applicator ceramic has $\epsilon=15$, a load chamber diameter of 50 mm and an outer diameter of 70 mm. At the top of the load there is just a 10 mm prolongation above the load level of the metal tube surrounding the ceramic; this acts as an efficient wavetrap due to the decay of the microwave field discussed above and it is therefore no need for additional microwave choking.

In the case that there are no moving objects in the applicator, there may be a tendency for distinct heating patterns caused by single or multiple degenerate resonant modes. This effect is strong, since the filling factor (the relation between load volume/load chamber volume) is uniquely high. The resulting uneven heating by this effect may be avoided by stirring of the load. Stirring of the load may easily be performed, since the thickness of the ceramic is only 10 mm (according to one exemplary advantageous embodiment), so that the distance from the load periphery to the outside of a surrounding 10 mm thick steel tube becomes only 25 mm. Since the applicator is fed from below and load access is from above, the cylindrical outside is available for a rotating permanent magnet, an electromagnet or a coil fed with a very low frequency (for example about 1 Hz) current according to known technology used to control a stirring means inside the load chamber (not shown in the figure).

The application of the stirring means requires that the steel tube through which the variable magnetic field has to act through must have a reasonably low electrical conductivity, and as said above, also operate at a very low frequency. A low electrical conductivity is thus one of the design criteria for the steel tube. Since this may also affect the microwave losses, a metallized layer of a high conductivity metal on the ceramic body is therefore an advantageous feature of the present invention. Actually, the special fitting process for the tubing means may incorporate the use of either applying gold foil or sputter gold on the ceramic in a pre-processing step. Due to the microwave frequencies used, a layer of only 3 µm is sufficient to obtain the desired high metallic conductivity of the ceramic surface.

Another criterion on the steel tube is that its thermal expansion coefficient must be in a suitable interval, in consideration of the pressure fitting (and operating temperature range) of the large applicator body.

A further criterion is that it should allow good special pressure-device welding alloys for the added top lid parts.

Using a thick stainless steel tube surrounding the applicator ceramic, letting the ceramic extend some 50–100 mm below the load chamber and providing various safety valves etc. only at the top door, a microwave apparatus may be constructed which not only is safe but also gives to the user a clear perception of safety.

The impedance matching of the microwave applicator is regarded a minor problem, since the load has a reasonable high permittivity and the electrical size of the applicator with load is several wavelengths in the material, in all coordinate directions.

In the following, one example of the microwave applicator according to the present invention is described. In this example the ceramic applicator has a permittivity of 15, an outer diameter of 70 mm and an inner hole with a diameter of 50 mm. The injected mode type was circular TM mode and the load in a borosilicate glass container has a volume of 53 mL.

It is of course of interest what matching properties and heating patterns can be expected. To that end, an applicator was preliminarily optimised with regard to impedance matching with different load permittivities and then run at 2460 MHz with the same loads. The investigation was made by modelling. The matching data are collected in Table 1.

TABLE 1

| Load permittivity | In-band resonant freq. (MHz) | Coupling factor at resonance | Freq. interval for coupling factor < 0.3 | Remarks |
|---|---|---|---|---|
| 60-j5 | 2492 | 0.09 | 2410 . . . 2510 | |
| 40-j20 | 2432 | 0.11 | 2390 . . . 2730 | |
| 30-j6 | 2422 | 0.17 | 2390 . . . 2620 | |
| 30-j1 | 2380 | 0.08 | 2360 . . . 2400 | 0.43 at 2450 |
| 20-j0.5 | 2468 | 0.10 | 2400 . . . 2490 | |
| 10-j2 | 2436 | 0.02 | 2400 . . . 2485 | |

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. Microwave heating apparatus comprising cylindrical elongated dielectric microwave applicator with an axial TM type mode, said dielectric applicator being provided with a load chamber for a load to be heated, said load chamber being located in a centred axial position inside the applicator, wherein two microwave feeding points are arranged at the lower end of the applicator for feeding microwave energy in the axial direction of the applicator resulting in Tmnp as the mode in the applicator, where m=1, 2, or 3, n and p>=1;

for m=1, the resulting mode is TM1 np wherein the coaxial microwave feeding points are arranged at the same distance from the centre axis of the applicator and separated a×90 degrees where a=1 or 3;

for m=2, the resulting mode is $TM_{2np}$ wherein the coaxial microwave feeding points are arranged at the same distance from the centre axis of the applicator and separated a×45 degrees, where a=1, 3, 5, or 7; and for m=3, the mode is $TM_{3np}$, wherein the coaxial microwave feeding points are arranged at the same distance from the centre axis of the applicator and separated a×30 degrees, where a=1, 2, 4, 5, 7, 10, or 11.

2. Microwave heating apparatus according to claim 1, wherein said load chamber has a volume of 10 mL or more.

3. Microwave heating apparatus according to claim 1, wherein a lower section of the dielectric applicator is shaped so that a mode filter for a circular TM1 np mode is achieved, in that no other modes being excited or reflected, where n and p>=1.

4. Microwave heating apparatus according to claim 3, wherein the lower section of the applicator has a conical shape.

5. Microwave heating apparatus according to claim 1, wherein applied microwaves have the same frequency or the two feeding points.

6. Microwave heating apparatus according to claim 1, wherein the dielectric applicator is made from alumina.

7. Microwave heating apparatus according to claim 1, wherein said apparatus further comprises a metal tubing means wherein the microwave applicator is fitted inside said tubing means to take up pressure generated In the applicator.

8. Microwave heating apparatus according claim 7, wherein said tubing means is a steel tube.

9. Microwave heating apparatus according to claim 7, wherein said tubing means is provided with a closure member adapted to seal the tubing means at the end facing an upper end of the applicator.

10. Microwave heating apparatus according claim 7, wherein said tubing means is provided with inward protruding means arranged to keep the applicator in place when exposed to high pressure.

11. Microwave heating apparatus according to claim 1, wherein said load chamber has an access opening in he axial direction on the end of the applicator opposite that of the feeding points.

12. Microwave heating apparatus according to claim 1, wherein said load chamber is essentially cylindrical.

13. Microwave heating apparatus according to claim 1, wherein an upper section of said microwave applicator has a cylindrical outer shape.

14. Microwave heating apparatus according to claim 1, wherein the lower section of the microwave applicator has an elliptical cross-section, wherein the two feeding points are along the major and minor axes, respectively.

15. A method of heating a load using a microwave heating apparatus according to claim 1.

16. A method according to claim 15, for performing chemical reactions and especially for organic chemical synthesis reaction.

17. A method according to claim 16, wherein the chemical reactions are organic chemical synthesis reactions.

18. A method of performing chemical reactions using the microwave heating apparatus according to claim 1.

19. A method according to claim 18, wherein the chemical reactions are organic chemical synthesis reactions.

* * * * *